US00RE42393E

(19) United States
(12) Reissued Patent
Watanabe

(10) Patent Number: US RE42,393 E
(45) Date of Reissued Patent: May 24, 2011

(54) TWO-PIECE SOLID GOLF BALL

(75) Inventor: Hideo Watanabe, Chichibu (JP)

(73) Assignee: Bridgestone Sports Co., Ltd., Tokyo (JP)

( * ) Notice: This patent is subject to a terminal disclaimer.

(21) Appl. No.: 11/268,753

(22) Filed: Nov. 8, 2005

Related U.S. Patent Documents

Reissue of:
(64) Patent No.: 6,758,766
Issued: Jul. 6, 2004
Appl. No.: 09/795,477
Filed: Mar. 1, 2001

(30) Foreign Application Priority Data

Mar. 15, 2000 (JP) ..... 2000-072898

(51) Int. Cl.
*A63B 37/06* (2006.01)

(52) U.S. Cl. ..... 473/374; 473/379

(58) Field of Classification Search ..... 473/367, 473/368, 383, 384, 385, 374
See application file for complete search history.

(56) References Cited

U.S. PATENT DOCUMENTS 5,252,652 A 10/1993 Egashira et al.
5,516,110 A 5/1996 Yabuki et al.
5,607,366 A 3/1997 Yokota et al.
5,645,496 A 7/1997 Endo et al.
5,803,833 A 9/1998 Nakamura et al.
5,803,834 A 9/1998 Yamagishi et al.
5,861,465 A 1/1999 Hamada et al.
5,876,294 A * 3/1999 Yamagishi et al. ..... 473/374
5,911,639 A 6/1999 Kasashima et al.
5,967,908 A 10/1999 Yamagishi et al.
6,121,357 A 9/2000 Yokota
6,319,154 B1 * 11/2001 Yoshida et al. ..... 473/378
6,386,993 B1 * 5/2002 Yokota ..... 473/373

(Continued)

FOREIGN PATENT DOCUMENTS

AU 09923581 10/1999

(Continued)

OTHER PUBLICATIONS

Eric Thain, Science and Golf IV, Proceedings of the World Scientific Congress of Golf, Jul. 2002, pp. 319-327.

*Primary Examiner* — Raeann Trimiew
(74) *Attorney, Agent, or Firm* — Sughrue Mion, PLLC

(57) ABSTRACT

In a two-piece solid golf ball comprising a solid core and a cover, the JIS-C hardness at the core surface minus the JIS-C hardness at the core center is 20–30 units, the cover has a gage of 1.3–2 mm and a Shore D hardness of 40–55, and the JIS-C hardness at the cover surface is not greater than the JIS-C hardness at the core surface. Dimples are formed on the cover surface to satisfy a total number of 360–492 and a percent dimple volume $V_R$ of 0.74–0.84%. The golf ball is susceptible to spin and easy to control upon approach shots and short iron shots, travels a long distance upon driver shots, gives a pleasant feel on any shot with driver, iron and putter clubs, and offers improved playability satisfying low-handicap players.

36 Claims, 2 Drawing Sheets

U.S. PATENT DOCUMENTS

| | | | | |
|---|---|---|---|---|
| 6,416,426 | B1 * | 7/2002 | Nakamura et al. | 473/378 |
| 6,465,578 | B1 | 10/2002 | Bissonnette et al. | |
| 6,565,453 | B2 | 5/2003 | Maruoka | |
| 6,632,148 | B2 | 10/2003 | Hayashi et al. | |
| 6,815,507 | B2 | 11/2004 | Ohama | |
| 2001/0002375 | A1 * | 5/2001 | Yokota | 473/377 |
| 2002/0055400 | A1 | 5/2002 | Higuchi et al. | |
| 2002/0061793 | A1 | 5/2002 | Higuchi et al. | |

FOREIGN PATENT DOCUMENTS

| | | | |
|---|---|---|---|
| JP | 60-249979 | A | 12/1985 |
| JP | 10-127823 | | 5/1998 |
| JP | 10-127823 | A | 5/1998 |
| JP | 11-290479 | | 10/1999 |
| JP | 11-290479 | A | 10/1999 |

* cited by examiner

TWO-PIECE SOLID GOLF BALL

Matter enclosed in heavy brackets [ ] appears in the original patent but forms no part of this reissue specification; matter printed in italics indicates the additions made by reissue.

BACKGROUND OF THE INVENTION

From the past, a number of improvements were made on two-piece golf balls. The main requirements on golf balls by players are concerned in distance, control and feel. Ordinary players make much of distance whereas skilled players set controllability above distance.

For golf balls, there were made a number of proposals for improvements in distance and controllability. For example, JP-A 10-127823 discloses a golf ball comprising a solid core and a cover which is improved in flight performance, controllability and feel by specifying the gage and JIS-C hardness of the cover and the type of solid core material and reducing the hardness difference between the solid core and the cover. JP-A 11-290479 discloses a golf ball which is improved in flight performance, controllability and feel by optimizing the hardness distribution and deflection or deformation of the core and the gage of the cover.

Since these proposals lay greatest store on distance increase, the cover is relatively hard. On use by skilled players, these balls receive less spin on approach shots and there is left a room for further improvement in controllability.

SUMMARY OF THE INVENTION

An object of the invention is to provide a two-piece solid golf ball which is susceptible to spin and easy to control upon approach shots and short iron shots, travels a long distance upon driver shots, gives a pleasant feel on any shot with driver, iron and putter clubs, and offers improved playability satisfying low-handicap players.

Regarding a golf ball comprising a solid core and a cover enclosing the core, the inventor made research to provide the golf ball with sufficient spin performance to satisfy the skilled players with respect to controllability.

The inventor has designed the golf ball such that the difference in JIS-C hardness between the center and the surface of the solid core (i.e., core surface hardness minus core center hardness) is at least 20 units, the cover has a gage of 1.3 to 2 mm and a Shore D hardness of up to 55, the difference in JIS-C hardness between the cover surface and the core surface (i.e., cover surface hardness minus core surface hardness) is up to 0, the total number of dimples is 360 to 492, and the percent dimple volume $V_R$ to be defined later is from 0.74% to 0.84%. Quite unexpectedly, not only the hardness balance in each structure of the solid core and the cover, but also the hardness balance of the overall ball are optimized, and as a consequence, the golf ball is susceptible to spin and easy to control upon approach shots and short iron shots, travels along a steadfast trajectory (neither dropping nor skying) upon driver shots and hence, a long distance, and gives a pleasant feel on any shot with driver, iron and putter clubs. Additionally, the ball offers a playability enough to satisfy low-handicap players who lay great store on control.

According to the invention, there is provided a two-piece solid golf ball comprising a solid core and a cover having a surface formed with a plurality of dimples, wherein the JIS-C hardness at the surface of the solid core minus the JIS-C hardness at the center of the solid core is at least 20 units; the cover has a gage of 1.3 to 2 mm and a Shore D hardness of up to 55, the JIS-C hardness at the cover surface minus the JIS-C hardness at the core surface is up to 0; the total number of dimples is 360 to 492; and the percent dimple volume $V_R$ is from 0.74% to 0.84% which is defined as a proportion (%) of the total of the volumes of dimple spaces each defined below a plane circumscribed by the dimple edge to the overall volume of a phantom sphere given on the assumption that the golf ball surface is free of dimples. Preferably, the solid core has a JIS-C hardness of up to 65 at its center.

BRIEF DESCRIPTION OF THE DRAWINGS

These and other objects, features and advantages of the present invention will be apparent with reference to the following description and drawings.

DESCRIPTION OF THE PREFERRED EMBODIMENT

Figure 1:
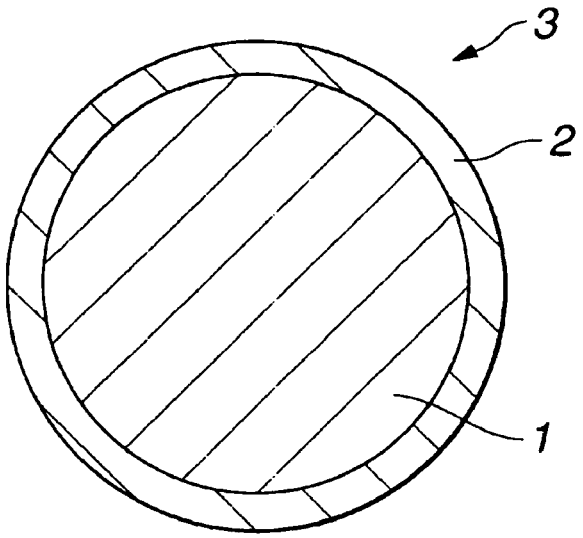
FIG. 1 is a schematic cross-sectional view of a two-piece solid golf ball according to one embodiment of the invention.

Referring to FIG. 1, a two-piece solid golf ball designated at 3 according to the invention is illustrated as comprising a solid core 1 and a cover 2 enclosing the core 1 in a concentric fashion.

The solid core may be formed of a well-known rubber composition comprising a base rubber, a crosslinking agent, and a peroxide. The base rubber used herein may be polybutadiene. The use of cis-1,4-polybutadiene having at least 40% of a cis configuration is preferred. In the base rubber, there may be additionally blended natural rubber, polyisoprene rubber, styrene-butadiene rubber or the like.

The crosslinking agent used herein may be selected from zinc and magnesium salts of unsaturated fatty acids such as zinc dimethacrylate and zinc diacrylate and esters of unsaturated fatty acids such as trimethylolpropane trimethacrylate. Zinc diacrylate is especially preferred for high restitution. The crosslinking agent is preferably used in an amount of about 20 to 50 parts by weight per 100 parts by weight of the base rubber.

Many organic peroxides are useful, for example, 1,1-bis(t-butylperoxy)-3,3,5-trimethylcyclohexane, dicumyl peroxide, di(t-butylperoxy)-m-diisopropylbenzene and 2,5-dimethyl-2,5-di-t-butylperoxyhexane. Commercially available peroxides are Percumyl D (by NOF Co., Ltd.) and Trigonox 29-40 (by Kayaku Akzo K.K.). The organic peroxide is preferably blended in an amount of at least about 0.1 part, especially at least 0.5 part by weight and up to 5 parts, especially up to 2 parts by weight, per 100 parts by weight of the base rubber.

In the rubber composition, there may be blended other additives such as sulfur, antioxidants, zinc oxide, barium sulfate, zinc pentachlorothiophenol, and zinc stearate, if desired. The amounts of these additives are conventional and not critical.

The solid core is prepared from the core-forming rubber composition by admixing the above components in a conventional mixer such as a Banbury mixer, kneader or roll mill, and molding the resulting compound in a core mold by a compression molding technique or the like.

The solid core thus prepared may be of the same shape as in conventional two-piece golf balls. Typically the solid core has a diameter of at least 38.7 mm, preferably at least 39 mm and up to 40.1 mm, preferably up to 39.8 mm, and a weight of at least 35 g, preferably at least 35.5 g and up to 38.8 g, preferably up to 38.4 g.

According to the invention, the solid core itself must have an optimized hardness distribution as prescribed by JIS-C hardness at the center and the surface thereof. It is noted that the JIS-C hardness of the solid core at the surface is also optimized with respect to its difference from the JIS-C hardness of the cover at the surface as will be described later.

The JIS-C hardness of the solid core is specified herein as the difference between the center hardness and the surface hardness. The JIS-C hardnesses at the center and the surface of the solid core are not critical. It is, however, recommended that the solid core at the center have a JIS-C hardness of at least 50, more preferably at least 54, most preferably at least 58, and up to 70, more preferably up to 66, most preferably up to 65; and at the surface have a JIS-C hardness of at least 78, more preferably at least 80, most preferably at least 82, and up to 92, more preferably up to 90, most preferably up to 88.

According to the invention, the difference in JIS-C hardness between the core and the surface of the solid core, represented by the core surface hardness minus the core center hardness, must be at least 20 units, especially at least 22 units. A less hardness difference leads to a too much spin rate and hence, a decline of flight performance. The upper limit of the JIS-C hardness difference is preferably up to 30 units, especially up to 26 units. With too much a hardness difference, the core (or ball) tends to lose resilience or rebound and may become less durable against repetitive strikes.

The hardness of the solid core is not critical as long as the specific JIS-C hardness difference is set between the surface and the center of the core. It is, however, recommended that the core itself have a compression of at least 2.4 mm, especially at least 2.6 mm and up to 3.5 mm, especially up to 3.3 mm. "Compression," as used herein, refers to the amount (mm) of deflection or deformation the core incurs when subjected to a load of 1,275 N (130 kgf) from an initial load of 98 N (10 kgf). If the solid core has too low a compression, the ball may be too hard to provide a soft feel and result in a shortened distance of travel upon driver shots due to an increased spin rate. On the other hand, a solid core with a compression that is too high may provide the ball with insufficient rebound, which can also shorten the distance of travel by the ball.

The cover may be formed of well-known cover materials. Exemplary cover materials include ionomer resins, thermoplastic polyester elastomers, thermoplastic polyamide elastomers, thermoplastic polyurethane elastomers, thermoplastic olefin elastomers, and mixtures thereof. Use of ionomer resins is preferred. Commercial products of ionomer resin are Himilan (DuPont-Mitsui Polychemicals Co., Ltd.), Surlyn (E. I. DuPont de Nemours and Company) and Iotek (Exxon Chemical Company).

In the cover material, there may be blended suitable amounts of various additives such as UV absorbers, antioxidants, metal soaps, pigments and inorganic fillers, if desired.

The golf ball of the invention can be prepared by well-known techniques, for example, injection molding and compression molding techniques. For example, when an injection molding technique is used, the preformed solid core is placed in an injection mold, following which the cover material is introduced into the mold and molded over the core in a conventional manner. In this way, the core is enclosed with the cover to produce a golf ball.

The cover must have a gage or radial thickness of at least 1.3 mm, especially at least 1.5 mm and up to 2 mm, especially up to 1.9 mm. With too thin a cover, the ball tends to acquire much spin on driver shots, resulting in a shortened distance of travel. Too thick a cover adversely affects the rebound of the ball.

Also the cover must have a Shore D hardness of up to 55, especially up to 53. Too high a Shore D hardness may result in such disadvantages as a hard feel and a decline of spin upon approach shots and short iron shots. The lower limit of cover Shore D hardness is recommended to be at least 40, especially at least 45. Too low a Shore D hardness may result in such disadvantages as less rebound and an increased spin rate upon driver shots, and hence a shortened distance of travel.

According to the invention, the JIS-C hardness of the cover at the outer surface must be adjusted such that the difference in JIS-C hardness between the cover and the solid core, defined as (cover surface hardness—core surface hardness), is up to 0, especially up to −5 units. If this hardness difference is more than 0 (i.e., if the cover surface JIS-C hardness is higher than the core surface JIS-C hardness), there results such disadvantages as a reduced spin rate upon driver shots, a rather dropping trajectory, and a shortened distance of travel (especially carry). The lower limit of hardness difference is −17 units, especially −12 units because this range of hardness difference prevents the ball from acquiring a much spin rate upon driver shots and from skying or traveling short.

The two-piece solid golf ball preferably has a compression of at least 2.2 mm, more preferably at least 2.4 mm and up to 3.5 mm, more preferably up to 3.2 mm, though this compression range is not critical.

In the two-piece solid golf ball, a plurality of dimples are formed on the cover surface. The invention requires to optimize the total number of dimples and a percent dimple volume $V_R$.

The total number of dimples is at least 360, preferably at least 370, more preferably at least 392 and up to 492, preferably up to 452, more preferably up to 432. A smaller number of dimples fail to provide an optimum lift or aerodynamic performance whereas a larger number of dimples lead to a lower trajectory and a shorter distance.

The percent volume $V_R$ associated with the dimples means a proportion (%) of the total of the volumes of dimple spaces each defined below a plane circumscribed by the dimple edge to the overall volume of a phantom sphere given on the assumption that the golf ball surface is free of dimples. Due to the synergistic effect achieved by optimizing both the total number of dimples and the percent dimple volume $V_R$, the golf ball is endowed with improved flight performance.

The percent dimple volume $V_R$ is calculated according to the following equation:

$$V_R = \frac{Vs}{\frac{4}{3}\pi R^3} \times 100$$

wherein Vs is the sum of the volumes Vp of dimple spaces each below a (circular) plane circumscribed by the dimple edge and R is a ball (phantom sphere) radius.

It is noted that Vs in the above equation is represented by the following equation, and $V_R$ can be calculated by substituting the value of Vs into the above equation of $V_R$.

$$Vs = N_1Vp_1 + N_2Vp_2 + \ldots + N_nVp_n = \sum_{i=1}^{n} N_iVp_i$$

$Vp_1, Vp_2, \ldots Vp_n$ represent the volumes of dimples of different dimensions, $N_1$, $N_2$, . . . $N_n$ represent the number of dimples having the volumes $Vp_1, Vp_2, \ldots Vp_n$, respectively, and n is an integer of at least 1.

Figure 2:
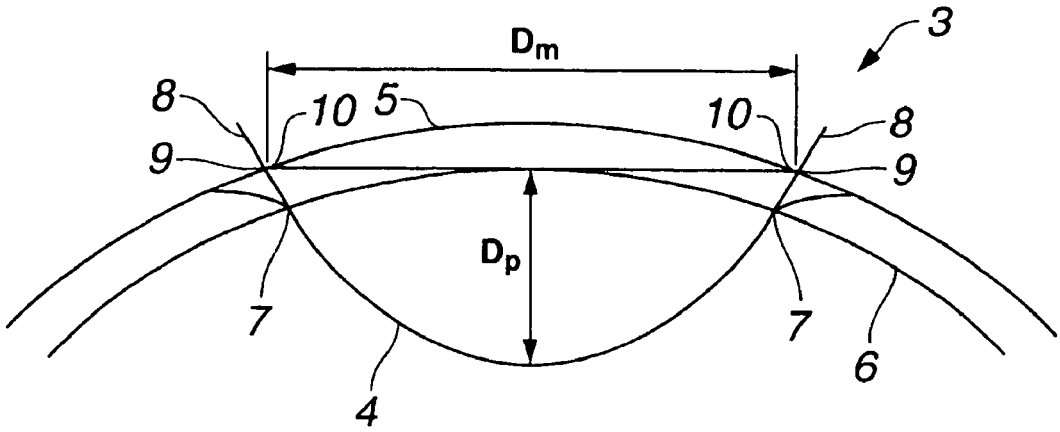
FIG. 2 is a schematic cross-sectional view of a dimple illustrating how to calculate its volume Vp.
Figure 3:
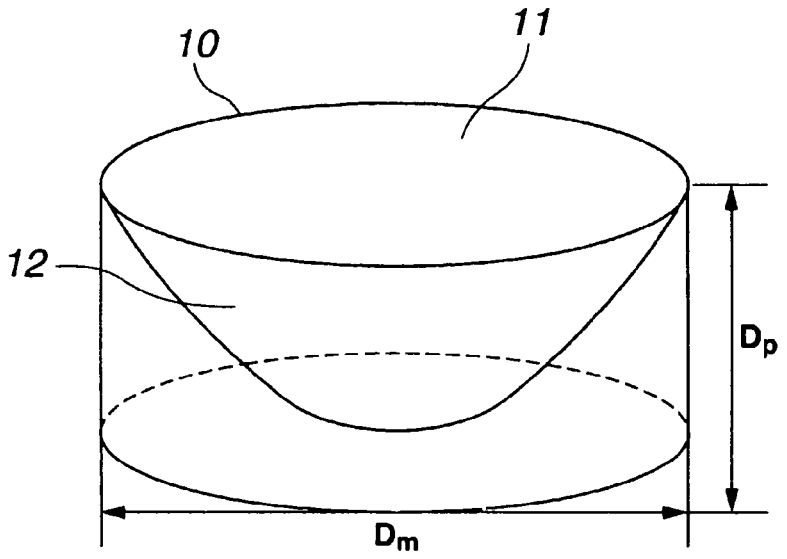
FIG. 3 is a perspective view of the same dimple.
Figure 4:
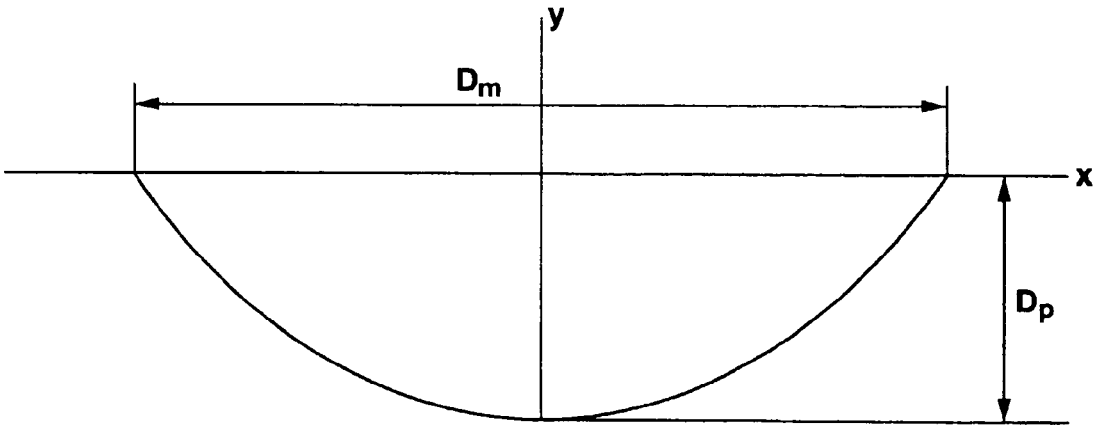
FIG. 4 is a cross-sectional view of the same dimple.

It is described how to determine the volume Vp of each dimple. In the event that the planar shape of a dimple is circular, as shown in FIG. 2, a phantom sphere 5 having the ball diameter and another phantom sphere 6 having a diameter smaller by 0.16 mm than the ball diameter are drawn in conjunction with a dimple 4. The circumference of the other sphere 6 intersects with the dimple 4 at a point 7. A tangent 8 at intersection 7 intersects with the phantom sphere 5 at a point 9 while a series of intersections 9 define a dimple edge 10. The dimple edge 10 is so defined for the reason that otherwise, the exact position of the dimple edge cannot be determined because the actual edge of the dimple 4 is rounded. The dimple edge 10 circumscribes a plane 11 (circle having a diameter Dm). The distance from the plane 11 to the bottom of the dimple gives a dimple depth Dp. Then, the volume Vp of the dimple space 12 is computed from the diameter Dm and the depth Dp. Where the dimples are of one type, a product of Vp by the total number of dimples is computed. Where the dimples are of two or more types, a product of the volume Vp of each type of dimple by the number of dimples of that type is computed, and such products are summed. In either case, the sum Vs of the overall dimple space volumes Vp is computed, from which $V_R$ is finally computed.

According to the invention, the percent dimple volume $V_R$ is at least 0.74%, especially at least 0.75% and up to 0.84%, especially up to 0.83%. With a lower $V_R$, the distance of travel is shortened due to skying. With a higher $V_R$, the trajectory becomes lowered and the carry shortened.

Due to the synergistic effect achieved by optimizing both the total number of dimples and the percent dimple volume $V_R$, the golf ball is endowed with improved flight performance. For further optimizing the dimples, the percent surface coverage $S_R$ of dimples is preferably set to be at least 68%, more preferably at least 70%, further preferably at least 72% while the upper limit thereof is preferably up to 82%, more preferably up to 80%, further preferably up to 79%. The percent surface coverage $S_R$ is a proportion (%) of the sum of the areas of dimples to the surface area of a phantom sphere given on the assumption that the golf ball surface is free of dimples. A $S_R$ within the range ensures a better balance of lift and drag.

The percent volume $V_R$ and percent surface coverage $S_R$ of dimples may be determined by measuring the dimensions of dimples on a product golf ball. Illustratively, after the cover is formed, the ball surface is subjected to finishing treatments such as painting and stamping. On the product golf ball having completed such finishing treatments, the dimensions of dimples are measured, from which the above factors are computed.

In the golf ball of the invention, dimple parameters including shape and arrangement other than the total number and $V_R$, and finishing treatments such as painting and stamping may be suitably selected as are with prior art golf balls.

The two-piece solid golf ball has a diameter and a weight as prescribed by the Rules of Golf, specifically a diameter of not less than 42.67 mm and a weight of not greater than 45.63 g.

The two-piece solid golf ball of the invention can comply with any scene during golf play, that is, upon driver shots, travel along a steadfast trajectory (neither dropping nor skying) and hence, an increased distance; upon approach shots and short iron shots, receive a more spin rate and become easy to control; give a pleasant feel on any shot with driver, iron and putter clubs. The spin rate the ball receives is large enough to satisfy low-handicap players.

EXAMPLE

Examples of the present invention are given below together with Comparative Examples by way of illustration and not by way of limitation.

Example I & Comparative Example I

Rubber compositions of the core formulation shown in Table 1 were admitted into core molds where they were vulcanized under the conditions shown in Table 1 to form solid cores. The JIS-C hardnesses of each solid core at the center and the surface were measured. The results are also shown in Table 1.

By injection molding cover materials of the composition shown in Table 1, covers were formed around the solid cores. In this way, golf balls were manufactured having dimples whose total number and $V_R$ are shown in Table 2.

It is noted that the trade names in Table 1 have the following meaning.

Himilan: ionomer resins by Dupont-Mitsui Polychemical Co., Ltd.

Nucrel AN4311: ethylene-methacrylic acid-acrylate terpolymer by Dupont-Mitsui Polychemical Co., Ltd.

Surlyn: ionomer resins by E. I. Dupont

Percumyl D: dicumyl peroxide by NOF Co., Ltd.

Trigonox 29-40: dicumyl peroxide white powder by Kayaku Akzo K.K.

Sulfur: sulfur having zinc white admixed by Tsurumi Chemical K.K.

The golf balls were examined by the following tests. The results are shown in Tables 1 and 2.

Compression

The compression was determined by measuring the amount (mm) of deflection or deformation by the ball or core when subjected to a load of 1275 N (130 kgf) from an initial load of 98 N (10 kgf).

Flight Performance

Using a swing robot, the ball was hit with a driver (W#1) at a head speed of 45 m/s. Carry, total distance and spin rate were measured.

Overall Evaluation of Flight

The overall flight performance of the ball was evaluated in terms of carry and total, with a greater emphasis on the total.

O: satisfactory carry and total; carry≧217 m and total≧230 m

Δ: short carry; carry≦216 m despite total≧230 m

X: short total; total≦229 m

Spin

The ball was hit with No. 9 iron at a head speed of 34 m/s. A spin rate was measured and evaluated as follows.

O: spin rate≧7000 rpm

X: spin rate≦6900 rpm

Feel

Five professional golfers actually hit the ball with a driver (W#1) and a putter (PT) to examine the ball for hitting feel according to the following criteria. When the golfers gave different ratings, the rating by the most golfers was employed.

Driver shots

O: pleasant click and satisfactory feel

X: too soft feel

Putter shots

O: soft and satisfactory feel

X: too hard feel enough to ensure controllability and to satisfy low-handicap golfers. The inventive golf balls presented a good feel on any shots with a driver and putter.

In contrast, the two-piece solid golf balls of Comparative Examples had some drawbacks.

Comparative Example 1: a low spin rate on iron shots; a hard feel on putter shots due to the hard cover Comparative Example 2: a less spin rate and a rather dropping trajectory on driver shots; a low spin rate on iron shots Comparative Example 3: a too much spin rate, a low initial velocity and a shorter distance on driver shots

TABLE 1

| | | Example | | | | | | Comparative Example | | | | | |
|---|---|---|---|---|---|---|---|---|---|---|---|---|---|
| | | 1 | 2 | 2 | 4 | 5 | 6 | 1 | 2 | 3 | 4 | 5 | 6 |
| Ball | Diameter (mm) | 42.7 | 42.7 | 42.7 | 42.7 | 42.7 | 42.7 | 42.7 | 42.7 | 42.7 | 42.7 | 42.7 | 42.7 |
| | Cover gage (mm) | 1.8 | 1.8 | 1.5 | 1.5 | 1.5 | 1.9 | 1.9 | 1.9 | 1.9 | 1.9 | 1.2 | 2.1 |
| | Weight (g) | 45.4 | 45.4 | 45.4 | 45.4 | 45.3 | 45.3 | 45.3 | 45.3 | 45.3 | 45.3 | 45.4 | 45.3 |
| | μ-hardness (mm) | 2.5 | 2.6 | 2.5 | 2.7 | 2.9 | 2.8 | 2.7 | 2.9 | 2.8 | 3.1 | 2.6 | 2.9 |
| Solid core | Outer diameter (mm) | 39.1 | 39.1 | 39.7 | 39.7 | 39.7 | 38.9 | 38.9 | 38.9 | 38.9 | 38.9 | 40.1 | 38.6 |
| | μ-hardness (mm) | 2.6 | 2.7 | 2.6 | 2.8 | 3.0 | 3.1 | 3.2 | 3.3 | 2.9 | 3.4 | 2.6 | 3.1 |
| | (1) Surface JIS-C hardness | 88 | 86 | 88 | 84 | 85 | 81 | 82 | 79 | 80 | 79 | 88 | 81 |
| | (2) Center JIS-C hardness | 64 | 61 | 65 | 59 | 55 | 61 | 61 | 59 | 62 | 59 | 66 | 61 |
| | (1)-(2) | 24 | 25 | 23 | 25 | 30 | 20 | 21 | 20 | 18 | 20 | 22 | 20 |
| Cover | (3) Shore D hardness | 53.0 | 53.0 | 51.5 | 51.5 | 51.5 | 50.0 | 63.0 | 57.2 | 48.0 | 55.0 | 50.0 | 50.0 |
| | (4) JIS-C hardness | 78.1 | 78.1 | 76.0 | 76.0 | 76.0 | 73.8 | 91.7 | 83.0 | 66.0 | 80.5 | 73.8 | 73.8 |
| Hardness difference* | (4)-(1) | −9.9 | −7.9 | −12 | −8 | −9 | −7.2 | 9.7 | 4 | −14 | 1.5 | −14.2 | −7.2 |
| Cover formulation | Himilan 1706 | | | | | | | 50 | | | | | |
| | Himilan 1557 | 20 | 20 | 20 | 20 | 20 | 20 | | | | | 20 | 20 |
| | Himilan 1555 | | | | | | | | 5 | | | | |
| | Himilan 1855 | 30 | 30 | 30 | 30 | 30 | 30 | | 95 | 35 | 35 | 30 | 30 |
| | Himilan 1605 | | | | | | | 50 | | | | | |
| | Surlyn 8320 | | | 20 | 20 | 20 | | | | | | | |
| | Surlyn 8120 | 50 | 50 | 30 | 30 | 30 | 30 | | | 35 | 35 | 30 | 30 |
| | Nucrel AN4311 | | | | | | 20 | | | 30 | 30 | 20 | 20 |
| | Titanium oxide | 5 | 5 | 5 | 5 | 5 | 5 | 5 | 5 | 5 | 5 | 5 | 5 |
| Solid core formulation | 1,4-polybutadiene | 100 | 100 | 100 | 100 | 100 | 100 | 95 | 100 | 100 | 100 | 100 | 100 |
| | Isoprene rubber | | | | | | | 5 | | | | | |
| | Zinc diacrylate | 42.5 | 40 | 42.5 | 40 | 38.5 | 31 | 26 | 25 | 34 | 27 | 42.5 | 31 |
| | Percumyl D | 0.6 | 0.6 | 0.6 | 0.6 | 0.6 | 0.6 | 0.65 | 0.6 | 0.6 | 0.6 | 0.6 | 0.6 |
| | Trigonox 29-40 | 0.8 | 0.8 | 0.8 | 0.8 | 0.8 | 0.6 | 0.6 | 0.6 | 0.6 | 0.6 | 0.8 | 0.6 |
| | Antioxidant | | | | | | | | 0.1 | 0.2 | | | |
| | Barium sulfate | 10.1 | 11.4 | 8.4 | 9.5 | 10.2 | 0 | 14.3 | 18.6 | 13.7 | 16.8 | 6.7 | |
| | Zinc oxide | 5 | 5 | 5 | 5 | 5 | 20 | 5 | 5 | 5 | 5 | 5 | 21.5 |
| | Zinc pentachlorothiophenol | 1 | 1 | 1 | 1 | 1 | 1 | | 0.2 | 1 | 1 | 1 | 1 |
| | Zinc stearate | | | | | | 5 | | | | | | 5 |
| | Sulfur | 0.1 | 0.1 | 0.1 | 0.1 | 0.1 | | | | | | 0.1 | |
| Vulcanizing conditions | Temperature (° C.) | 175 | 175 | 175 | 175 | 175 | 165 | 165 | 165 | 155 | 165 | 175 | 165 |
| | Time (min) | 15 | 15 | 15 | 15 | 15 | 15 | 15 | 15 | 15 | 15 | 15 | 15 |

*Hardness difference is JIS-C hardness at cover surface minus JIS-C hardness at solid core surface.

TABLE 2

| | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Dimples | Total number | 432 | 432 | 432 | 432 | 432 | 432 | 432 | 432 | 432 | 432 | 432 | 432 |
| | $V_R$ (%) | 0.78 | 0.78 | 0.78 | 0.78 | 0.78 | 0.78 | 0.78 | 0.78 | 0.78 | 0.78 | 0.78 | 0.78 |
| Flight performance @W#1/HS45 | Carry (m) | 2191 | 219.0 | 218.9 | 218.2 | 218.3 | 218.8 | 218.3 | 216.0 | 217.5 | 216.6 | 219.0 | 217.1 |
| | Total (m) | 230.3 | 233.6 | 233.3 | 230.3 | 231.7 | 231.2 | 233.5 | 232.0 | 228.4 | 228.5 | 228.5 | 228.9 |
| | Spin (rpm) | 2850 | 2808 | 2799 | 2742 | 2661 | 2828 | 2634 | 2500 | 2910 | 2524 | 2954 | 2801 |
| | Overall | ○ | ○ | ○ | ○ | ○ | ○ | ○ | Δ | X | X | X | X |
| Flight performance @I#9 | Spin (rpm) | 7238 | 7106 | 7216 | 7035 | 7021 | 7142 | 6750 | 6799 | 7245 | 6850 | 7310 | 7155 |
| | Evaluation | ○ | ○ | ○ | ○ | ○ | ○ | X | X | ○ | X | ○ | ○ |
| Feel | W#1 | ○ | ○ | ○ | ○ | ○ | ○ | ○ | ○ | ○ | X | ○ | ○ |
| | PT | ○ | ○ | ○ | ○ | ○ | ○ | X | ○ | ○ | ○ | ○ | ○ |

As is evident from Table 2, the two-piece solid golf balls within the scope of the invention, upon driver shots, gave a satisfactory feel, traveled a steadfast trajectory without dropping or skying, and marked an increased distance. Upon iron shots, the inventive golf balls acquired a more spin rate Comparative Example 4: a less spin rate, a dropping trajectory and a too soft feel on driver shots; a low spin rate on iron shots Comparative Example 5: a too much spin rate, a rather skying trajectory and a shorter distance on driver shots Comparative Example 6: a less spin rate, less rebound and a shorter distance on driver shots Example II & Comparative Example II Using the same core and cover materials as in Example 3, two-piece solid golf balls were manufactured to the same structure as in Example 3 except that the dimple parameters (including total number, percent dimple volume $V_R$ and percent surface coverage $S_R$) were changed.

Using the same swing robot as in Example I, the golf balls were hit with a driver (W#1) at a head speed of 45 m/s. Carry and total distance were measured. The results are shown in Table 3.

TABLE 3

| | | Example | | | | | Comparative Example | | | | |
|---|---|---|---|---|---|---|---|---|---|---|---|
| | | 3 | 7 | 8 | 9 | 10 | 7 | 8 | 9 | 10 | 11 |
| Dimples | Total number | 432 | 392 | 420 | 392 | 392 | 392 | 392 | 500 | 392 | 336 |
| | $S_R$ (%) | 75.5 | 75.1 | 78.1 | 74.7 | 75.2 | 75.1 | 74.7 | 70.0 | 75.2 | 58.7 |
| | $V_R$ (%) | 0.78 | 0.78 | 0.75 | 0.75 | 0.83 | 0.73 | 0.71 | 0.79 | 0.86 | 0.80 |
| Flight | Carry (m) | 218.9 | 217.5 | 217.2 | 219.2 | 217.6 | 218.1 | 216.3 | 214.1 | 215.2 | 213.5 |
| performance | Total (m) | 233.3 | 231.4 | 230.0 | 233.1 | 230.3 | 229.0 | 227.9 | 226.2 | 227.0 | 226.1 |
| @W#1/HS45 | Spin evaluation | ○ | ○ | ○ | ○ | ○ | X | X | X | X | X |

As is evident from Table 3, the inventive golf balls exhibited satisfactory flight performance whereas the comparative golf balls had some drawbacks.

Comparative Example 7: skying and short travel due to a small value of $V_R$

Comparative Example 8: skying and short travel due to a smaller value of $V_R$ than in CE7

Comparative Example 9: low trajectory and short travel due to a too large number of dimples Comparative Example 10: low trajectory and short travel due to a large value of $V_R$ Comparative Example 11: short travel due to a small number of dimples and a small value of $S_R$ Japanese Patent Application No. 2000-072898 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

[1. A two-piece solid golf ball comprising a solid core and a cover having a surface formed with a plurality of dimples, wherein the solid core has JIS-C hardnesses at its center and its surface, the JIS-C hardness at the core surface minus the JIS-C hardness at the core center is from 22 to 30 units, the cover has a gage of 1.3 to 2 mm and a Shore D hardness of up to 55, and has a JIS-C hardness at its surface, the JIS-C hardness at the cover surface minus the JIS-C hardness at the core surface is 17 to −5 units, the total number of dimples is 360 to 492, and the percent dimple volume $V_R$ is from 0.74% to 0.84%, wherein $V^R$ is defined as a proportion (%) of the sum of all dimple volumes, each dimple volume defined below a plane circumscribed by the dimple edge, to the overall volume of a phantom golf ball that is free of dimples.]

[2. The golf ball of claim 1 wherein the solid core has a JIS-C hardness of 50–65 at its center and 78 to 92 at its surface, respectively.]

[3. The golf ball of claim 1 wherein a dimple percent surface coverage $S_R$ is 68 to 82%, wherein $S^R$ is a proportion (%) of the sum of the areas of dimples to the surface area of a phantom golf ball surface that is free of dimples.]

[4. The golf ball of claim 3 wherein the dimple percent surface coverage $S^R$ is 72 to 82%.]

[5. The golf ball, of claim 1 wherein the solid core is formed of a rubber composition comprising a base rubber, a crosslinking agent, and a peroxide and the cover is formed of materials including ionomer resins, thermoplastic polyester elastomers, thermoplastic polyamide elastomers, thermoplastic polyurethane elastomers, thermoplastic olefin elastomers, and mixtures thereof.]

*6. A golf ball constituted two layers comprising a core and a cover, said core being formed of a rubber composition including 100 parts by weight of a rubber component, 0.1 part by weight of sulfur and 1 part by weight of zinc pentachlorothiophenol, wherein a difference determined by subtracting a center hardness of said core from a surface hardness of said core is at least 25 in terms of JIS-C hardness.*

*7. The golf ball according to claim 6, wherein said core has a center hardness of 50 to 55 in terms of JIS-C hardness.*

*8. A golf ball constituted of two layers comprising a core and a cover, said core being formed of a rubber composition including 100 parts by weight of a rubber component, 0.1 part by weight of sulfur and 1 part by weight of zinc pentachlorothiophenol, wherein the ratio of the amount of sulfur to the amount of organic sulfur compound is 0.01 to 2.0 wherein a difference determined by subtracting a center hardness of said core from a surface hardness of said core is at least 25 in terms of JIS-C hardness wherein an amount of deformation of said core under a load from an initial load of 98 N to a final load of 1274 N is 2.4 to 3.5 mm.*

*9. The golf ball according to claim 8, wherein said core has a center hardness of 50 to 55 in terms of JIS-C hardness.*

*10. A golf ball constituted of two layers, consisting essentially of:*

*a core and a cover;*

*said core being formed of a rubber composition including 100 parts by weight of a rubber component, 0.1 part by weight of sulfur and 1 part by weight of zinc pentachlorothiophenol;*

*wherein a difference determined by subtracting a center hardness of said core from a surface hardness of said core is at least 25 in terms of JIS-C hardness.*

*11. The golf ball according to claim 10, wherein a difference determined by subtracting a center hardness of said core from a surface hardness of said core is 25 to 30 in terms of JIS-C hardness.*

*12. The golf ball according to claim 10, wherein said core has a center hardness of 50 to 55 in terms of JIS-C hardness.*

*13. The golf ball according to claim 10, wherein said core has a center hardness of 50 to 65 in terms of JIS-C hardness.*

*14. A golf ball constituted of two layers, consisting essentially of:*

*a core and a cover;*

*said core being formed of a rubber composition including 100 parts by weight of a rubber component, 0.1 part by weight of sulfur and 1 part by weight of zinc pentachlorothiophenol;*

*wherein a difference determined by subtracting a center hardness of said core from a surface hardness of said core is at least 25 in terms of JIS-C hardness; and*

*wherein an amount of deformation of said core under a load from an initial load of 98 N to a final load of 1,275 N is 2.4 to 3.5 mm.*

*15. The golf ball according to claim 14, wherein a difference determined by subtracting a center hardness of said core from a surface hardness of said core is 25 to 30 in terms of JIS-C hardness.*

*16. The golf ball according to claim 14, wherein said core has a center hardness of 50 to 55 in terms of JIS-C hardness.*

*17. The golf ball according to claim 14, wherein said core has a center hardness of 50 to 65 in terms of JIS-C hardness.*

*18. A golf ball constituted of two layers comprising a core and a cover, said core being formed of a rubber composition including a rubber component, sulfur and zinc pentachlorothiophenol, wherein a difference determined by subtracting a center hardness of said core from a surface hardness of said core is at least 25 in terms of JIS-C hardness.*

*19. A golf ball constituted of two layers comprising a core and a cover, said core being formed of a rubber composition including a rubber component, sulfur and zinc pentachlorothiophenol, wherein a difference determined by subtracting a center hardness of said core from a surface hardness of said core is at least 25 in terms of JIS-C hardness wherein an amount of deformation of said core under a load from an initial load of 98 N to a final load of 1274 N is 2.4 to 3.5 mm.*

*20. A golf ball comprising a core and a cover, said core being formed of a rubber composition including 100 parts by weight of a rubber component, 0.1 part by weight of sulfur and 1 part by weight of zinc pentachlorothiophenol, wherein a difference determined by subtracting a center hardness of said core from a surface hardness of said core is at least 25 in terms of JIS-C hardness.*

*21. A golf ball comprising a core and a cover, said core being formed of a rubber composition including 100 parts by weight of a rubber component, 0.1 part by weight of sulfur and 1 part by weight of zinc pentachlorothiophenol organic sulfur, wherein a difference determined by subtracting a center hardness of said core from a surface hardness of said core is at least 25 in terms of JIS-C hardness wherein an amount of deformation of said core under a load from an initial load of 98 N to a final load of 1274 N is 2.4 to 3.5 mm.*

*22. A golf ball comprising a core and a cover, said core being formed of a rubber composition including a rubber component, sulfur and zinc pentachlorothiophenol wherein a difference determined by subtracting a center hardness of said core from a surface hardness of said core is at least 25 in terms of JIS-C hardness.*

*23. A golf ball comprising a core and a cover, said core being formed of a rubber composition including a rubber component, sulfur and zinc pentachlorothiophenol wherein a difference determined by subtracting a center hardness of said core from a surface hardness of said core is at least 25 in terms of JIS-C hardness wherein an amount of deformation of said core under a load from an initial load of 98 N to a final load of 1274 N is 2.4 to 3.5 mm.*

*24. The golf ball according to claim 18, wherein a difference determined by subtracting a center hardness of said core from a surface hardness of said core is 25 to 30 in terms of JIS-C hardness.*

*25. The golf ball according to claim 18, wherein said core has a center hardness of 50 to 55 in terms of JIS-C hardness.*

*26. The golf ball according to claim 18, wherein said core has a center hardness of 50 to 65 in terms of JIS-C hardness.*

*27. The golf ball according to claim 19, wherein a difference determined by subtracting a center hardness of said core from a surface hardness of said core is 25 to 30 in terms of JIS-C hardness.*

*28. The golf ball according to claim 19, wherein said core has a center hardness of 50 to 55 in terms of JIS-C hardness.*

*29. The golf ball according to claim 19, wherein said core has a center hardness of 50 to 65 in terms of JIS-C hardness.*

*30. The golf ball according to claim 20, wherein a difference determined by subtracting a center hardness of said core from a surface hardness of said core is 25 to 30 in terms of JIS-C hardness.*

*31. The golf ball according to claim 20, wherein said core has a center hardness of 50 to 55 in terms of JIS-C hardness.*

*32. The golf ball according to claim 20, wherein said core has a center hardness of 50 to 65 in terms of JIS-C hardness.*

*33. The golf ball according to claim 21, wherein a difference determined by subtracting a center hardness of said core from a surface hardness of said core is 25 to 30 in terms of JIS-C hardness.*

*34. The golf ball according to claim 21, wherein said core has a center hardness of 50 to 55 in terms of JIS-C hardness.*

*35. The golf ball according to claim 21, wherein said core has a center hardness of 50 to 65 in terms of JIS-C hardness.*

*36. The golf ball according to claim 22, wherein a difference determined by subtracting a center hardness of said core from a surface hardness of said core is 25 to 30 in terms of JIS-C hardness.*

*37. The golf ball according to claim 22, wherein said core has a center hardness of 50 to 55 in terms of JIS-C hardness.*

*38. The golf ball according to claim 22, wherein said core has a center hardness of 50 to 65 in terms of JIS-C hardness.*

*39. The golf ball according to claim 23, wherein a difference determined by subtracting a center hardness of said core from a surface hardness of said core is 25 to 30 in terms of JIS-C hardness.*

*40. The golf ball according to claim 23, wherein said core has a center hardness of 50 to 55 in terms of JIS-C hardness.*

*41. The golf ball according to claim 23, wherein said core has a center hardness of 50 to 65 in terms of JIS-C hardness.*

* * * * *

UNITED STATES PATENT AND TRADEMARK OFFICE

CERTIFICATE OF CORRECTION

PATENT NO. : RE42,393 E
APPLICATION NO. : 11/268753
DATED : May 24, 2011
INVENTOR(S) : Hideo Watanabe It is certified that error appears in the above-identified patent and that said Letters Patent is hereby corrected as shown below:

In the Specification

Column 1, line 8, above the heading, "BACKGROUND OF THE INVENTION" insert -- Notice: More than one reissue application has been filed for the reissue of patent 6,758,766. The reissue applications 11/268753, now re42393, and continuation reissue 13/088639. --.

Signed and Sealed this
Twenty-third Day of June, 2015

Michelle K. Lee

Michelle K. Lee
*Director of the United States Patent and Trademark Office*